(12) United States Patent
Maeda et al.

(10) Patent No.: US 10,580,456 B2
(45) Date of Patent: Mar. 3, 2020

(54) DRIVING INFORMATION RECORDING APPARATUS

(71) Applicant: DENSO TEN Limited, Kobe-shi, Hyogo (JP)

(72) Inventors: Munenori Maeda, Kobe (JP); Minoru Maehata, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 15/879,693

(22) Filed: Jan. 25, 2018

(65) Prior Publication Data

US 2018/0218758 A1 Aug. 2, 2018

(30) Foreign Application Priority Data

Feb. 1, 2017 (JP) ................. 2017-016896

(51) Int. Cl.
| | |
|---|---|
| *H04N 9/80* | (2006.01) |
| *H04N 7/18* | (2006.01) |
| *G11B 27/036* | (2006.01) |
| *G07C 5/08* | (2006.01) |
| *G11B 27/36* | (2006.01) |
| *H04N 5/77* | (2006.01) |
| *H04N 5/92* | (2006.01) |
| *H04N 9/82* | (2006.01) |
| *H04N 5/907* | (2006.01) |
| *H04N 7/00* | (2011.01) |

(52) U.S. Cl.
CPC .......... *G11B 27/036* (2013.01); *G07C 5/0866* (2013.01); *G07C 5/0891* (2013.01); *G11B 27/36* (2013.01); *H04N 5/77* (2013.01); *H04N 5/907* (2013.01); *H04N 5/9201* (2013.01); *H04N 9/8205* (2013.01)

(58) Field of Classification Search
USPC .............. 386/239, 248, 242; 348/118, 61
See application file for complete search history.

(56) References Cited

U.S. PATENT DOCUMENTS

| | | | | |
|---|---|---|---|---|
| 6,405,112 | B1 * | 6/2002 | Rayner | B60R 1/00 340/426.28 |
| 9,701,307 | B1 * | 7/2017 | Newman | B60W 50/16 |
| 2005/0192722 | A1 * | 9/2005 | Noguchi | G05B 23/0264 701/33.4 |
| 2007/0109106 | A1 * | 5/2007 | Maeda | B60R 25/10 340/426.1 |

FOREIGN PATENT DOCUMENTS

| | | |
|---|---|---|
| JP | 2009-295189 A | 12/2009 |
| JP | 2012-018654 A | 1/2012 |

* cited by examiner

*Primary Examiner* — Daquan Zhao
(74) *Attorney, Agent, or Firm* — Oliff PLC

(57) ABSTRACT

A driving information recording apparatus that records driving information of a vehicle, the apparatus includes: a processor that: (i) associates, as a data file, information related to a driving condition of the vehicle with a driving mode of the vehicle at a time at which the driving condition occurred, and (ii) records the data file in a recording medium having a recording area. Thus, it is possible to provide a preferred technology for recording the driving information of the vehicle that has a switching function of driving modes.

18 Claims, 13 Drawing Sheets

DRIVING INFORMATION RECORDING APPARATUS

BACKGROUND OF THE INVENTION

Field of the Invention

The invention relates to a driving information recording apparatus.

Description of the Background Art

Vehicle autonomous driving technologies have been actively developed and, for example, it is expected that a vehicle in which switching between a manual driving mode and an autonomous driving mode can be performed will increase in the future.

A drive recorder has been used for investigating causes of traffic accidents, monitoring driver's driving conditions by transportation companies, and the like.

However, under current circumstances, the drive recorder suitable for such a vehicle that has a switching function of driving modes has not been sufficiently developed.

SUMMARY OF THE INVENTION

According to one aspect of the invention, a driving information recording apparatus that records driving information of a vehicle, the apparatus includes: a processor that: (i) associates, as a data file, information related to a driving condition of the vehicle with a driving mode of the vehicle at a time at which the driving condition occurred, and (ii) records the data file in a recording medium having a recording area.

Thus, according to the invention, it is possible to provide a preferred technology for recording driving information of the vehicle that has a switching function of driving modes.

According to another aspect of the invention, a display system that displays driving information, the display system includes: a driving information recording apparatus that records driving information of a vehicle, the apparatus having a processor that: (i) associates, as a data file, information related to a driving condition of the vehicle with a driving mode of the vehicle at a time at which the driving condition occurred, and (ii) records the data file in a recording medium; and a display processing apparatus that displays the information recorded in the recording medium on a display apparatus.

Thus, according to the invention, it is possible to provide a technology suitable for displaying recorded driving information.

Therefore, an object of the invention is to provide a preferred technology for recording the driving information of the vehicle that has the switching function of driving modes. Furthermore, another objection of the invention is to provide a technology suitable for displaying recorded driving information.

These and other objects, features, aspects and advantages of the invention will become more apparent from the following detailed description of the invention when taken in conjunction with the accompanying drawings.

DESCRIPTION OF THE EMBODIMENTS

Exemplified embodiments of the invention will be described below with reference to the drawings.

1. First Embodiment

<1-1. Drive Recorder>

Figure 1:
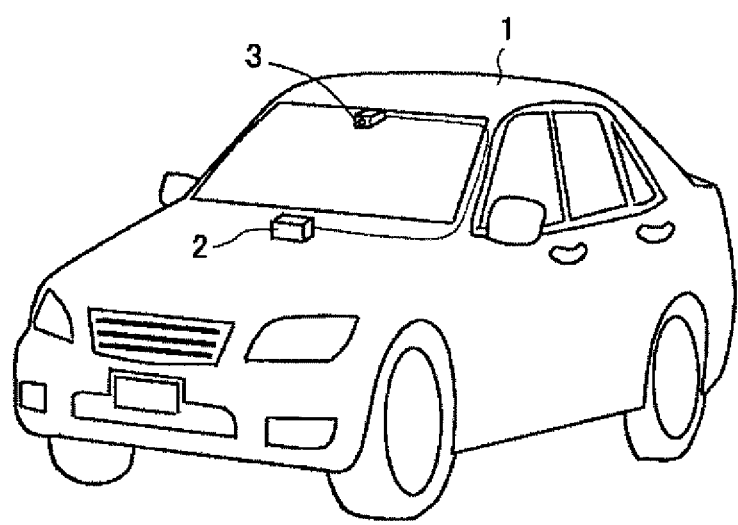
FIG. 1 is a diagram explaining an outline of a drive recorder.

FIG. 1 is a diagram explaining an outline of a drive recorder 2 according to this embodiment. The drive recorder 2 is one example of a driving information recording apparatus according to the invention. The drive recorder 2 is mounted on a vehicle 1. The drive recorder 2 is placed in an appropriate position of the vehicle 1. In this embodiment, the vehicle 1 is an automobile. The vehicle 1 is provided with a plurality of switchable driving modes including an autonomous driving mode.

The autonomous driving mode is a driving mode in which at least any one of a driving operation, a braking operation and a steering operation is automatically performed, regardless of an operation by a driver. That is, the autonomous driving mode may be a driving mode in which the driver does not perform both of the steering operation and acceleration and deceleration operations, but may be, for example, a driving mode in which only a braking assistance is performed. In this embodiment, the vehicle 1 can be switched to a non-autonomous driving mode except the autonomous driving mode. The non-autonomous driving mode may be, for example, a manual driving mode in which both of the steering operation and the acceleration and deceleration operations are performed in accordance with a driver's operation. In this embodiment, there are two types of driving modes. One is the autonomous driving mode and the other one is the non-autonomous driving mode. However, this is only an example, and three or more types of driving modes may exist.

The drive recorder 2 acquires an image of surroundings of the vehicle 1 that is captured by a camera 3 that is mounted on the vehicle 1. In this embodiment, the drive recorder 2 adopts a normal recording method that allows information related to a driving condition including the image captured by the camera 3 to be periodically recorded in a recording medium (not illustrated). However, this is only an example. For example, when an event such as a sudden braking, an impact or the like is detected, the drive recorder 2 may adopt an event recording method that allows the image captured by the camera 3 and the information related to the driving condition other than an image including contents of the event to be recorded in the recording medium.

In this embodiment, the drive recorder 2 is driven by electric power supplied from a battery (not illustrated) that the vehicle 1 includes. Furthermore, in this embodiment, the drive recorder 2 starts driving in response to a case in which an IG (ignition) is turned on. The drive recorder 2 stops driving in response to a case in which the IG is turned off. This is only an example and, for example, the drive recorder 2 may switch between start and stop of driving in connection with a case in which an ACC (accessory) is turned on or off.

Figure 2:
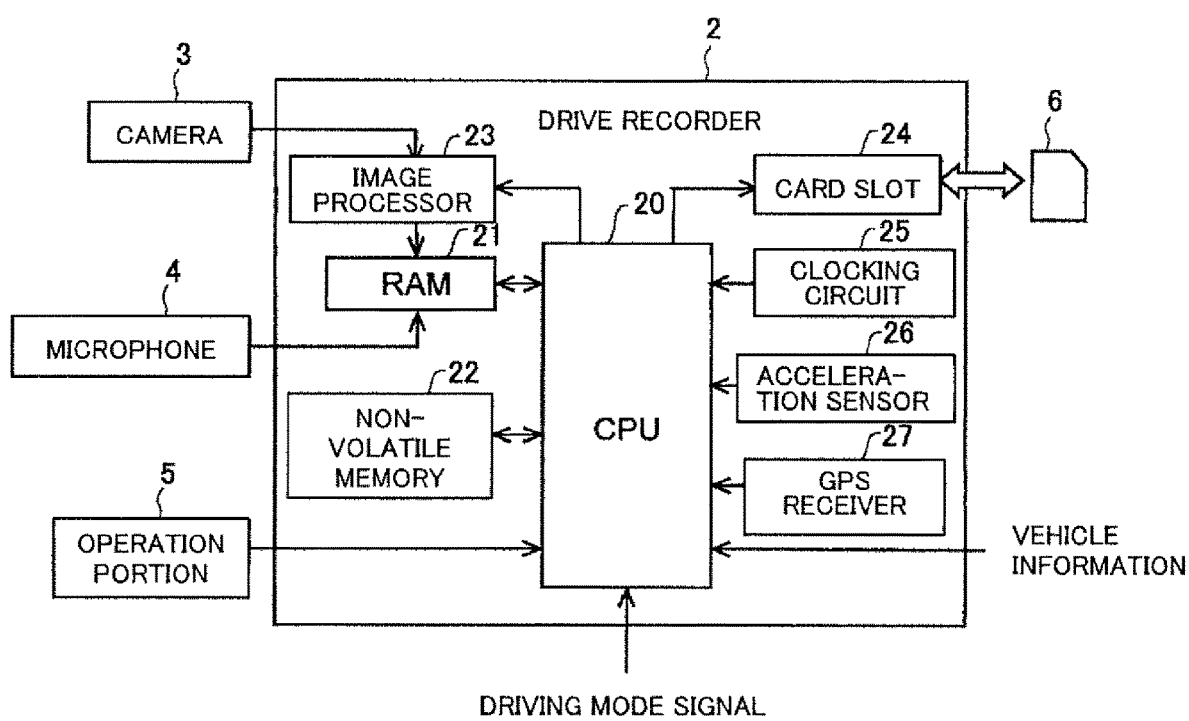
FIG. 2 is a diagram illustrating a configuration of the drive recorder.

FIG. 2 is a block diagram illustrating a configuration of the drive recorder 2 according to this embodiment. The drive recorder 2 includes a microcomputer as a controller that controls an entire apparatus. More specifically, the drive recorder 2 includes a CPU 20 (central processing unit) that realizes various control functions by performing a calculation process, a RAM 21 (random access memory) that becomes a work area of the calculation process and a non-volatile memory 22 that stores various data. Examples of the non-volatile memory 22 include a hard disk drive and a flash memory. The non-volatile memory 22 stores a program as a firmware, a setting parameter, and the like. Functions to control each part of the drive recorder 2 can be realized by the CPU 20 performing the calculation process according to the program stored beforehand in the non-volatile memory 22. The CPU 20 is one example of a processor according to the invention.

The camera 3 and a microphone 4 are connected to the drive recorder 2. The camera 3 and the microphone 4 may be included in the drive recorder 2. The camera 3 includes a lens and an imaging element, and can electronically acquire image data. In this embodiment, the camera 3 is placed in a vicinity of an upper part of a front windshield in a state in which an optical axis of the camera 3 is directed to a front side of the vehicle 1. A number and a placement of the camera 3 may be changed as appropriate. For example, a front camera that captures images of an area in front of the vehicle 1 and a back camera that captures images of an area behind the vehicle 1 may be included. The microphone 4 is, for example, placed on a body part of the drive recorder 2 or an appropriate position of the vehicle 1. The microphone 4 acquires audio data by collecting sounds in a vicinity of the vehicle 1.

The drive recorder 2 includes an image processor 23 that processes the image data captured by the camera 3. In this embodiment, the image processor 23 is a hardware circuit. The image processor 23 performs a predetermined image process for a signal of the image data input from the camera 3, and generates digital image data in a predetermined format. The predetermined image process includes, for example, an A/D conversion, a brightness correction, a contrast correction, etc. The predetermined format may be, for example, a JPEG format or the like. The image data processed by the image processor 23 is stored in the RAM 21.

A part of a storage area of the RAM 21 is used as a ring buffer. The image data processed by the image processor 23 and the audio data acquired by the microphone 4 are continuously stored in the ring buffer. In the ring buffer, when the data is stored in the last storage area, it returns to the first storage area and new data is stored in the first storage area. That is, in the ring buffer, the oldest data is sequentially overwritten with the new data. Therefore, the image data and the audio data for a past certain period of time is always stored in the RAM 21.

The drive recorder 2 is connected to an operation portion 5 that receives an instruction from the driver or the like. The operation portion 5 may be included in the drive recorder 2. The operation portion 5 is placed in an appropriate position of the vehicle 1, such as in a vicinity of a steering wheel (not illustrated) or the like, so as to be operated easily by the driver or the like. The drive recorder 2 includes a card slot 24, a clocking circuit 25, an acceleration sensor 26 and a GPS receiver 27 (global positioning system).

The card slot 24 is configured such that a memory card is 6 attachably and detachably mounted on the card slot 24. The memory card 6 is one example of the recording medium of the invention. The recording medium of the invention is not limited to the memory card 6. For example, the recording medium of the invention may be the hard disk drive, an optical disk, a magnet-optical disk, a flexible disk or the like. In a case where the recording medium other than the memory card 6 is used, a component instead of the card slot 24 is included in the drive recorder 2. For example, instead of the card slot 24, an optical disk apparatus or the like is included in the drive recorder 2.

The memory card 6 is mounted on the card slot 24 so that it becomes possible to read the data from the memory card 6 and write the data into the memory card 6. In this embodiment, the image data and the audio data or the like stored in the ring buffer of the RAM 21 is periodically recorded in the memory card 6 mounted on the card slot 24 by an instruction of the CPU 20. When a new memory card 6 is set on the card slot 24, the CPU 20 records a vehicle number to be stored in the non-volatile memory 22 in the memory card 6. This is because it shows that the information to be recorded subsequently is recording information by a host drive recorder.

The clocking circuit 25 generates a signal corresponding to a current time and outputs the signal to the CPU 20. For example, the clocking circuit 25 has an internal battery so as to count an accurate clock time without receiving supply of electric power from an external power source.

The acceleration sensor 26 detects acceleration that indicates a magnitude of the impact applied to the vehicle 1. The acceleration is detected in units of gravitational acceleration G. The acceleration to be detected is a momentary value of the acceleration at a current time and, for example, is generated in directions of mutually orthogonal three axes or two axes. The acceleration sensor 26 outputs a signal corresponding to such acceleration to the CPU 20.

The GPS receiver 27 receives a signal from a plurality of GPS satellites and acquires a location of a host vehicle that is a location of the vehicle 1 at the current time. The GPS receiver 27 acquires the location of the host vehicle as location information expressed by longitude and latitude, and outputs the information to the CPU 20. The GPS receiver 27 can detect an accurate clock time base on the signal from the GPS satellites. Therefore, the GPS receiver 27 may be used instead of the clocking circuit 25. The GPS receiver 27 may be used for correcting the time of the clocking circuit 25.

Besides, vehicle information including data from a vehicle speed sensor or the like is input to the CPU 20 via a CAN bus (not illustrated). The vehicle information may include steering information, brake information, accelerator information or the like. The signal that indicates the driving mode of the vehicle 1 (hereinafter, referred to as a "driving mode signal") is input to the CPU 20. The CPU 20 can recognize the driving mode of the vehicle 1 by the driving mode signal. In this embodiment, the CPU 20 recognizes that the driving mode of the vehicle 1 is either the autonomous driving mode or the non-autonomous driving mode by the driving mode signal. The driving mode signal may be, for example, an ON/OFF signal. For example, in a case where the ON signal is input to the CPU 20, the CPU 20 recognizes that the vehicle 1 is in the autonomous driving mode. In a case where the OFF signal is input to the CPU 20, the CPU 20 recognizes that the vehicle 1 is in the non-autonomous driving mode.

In this embodiment, the driving mode of the vehicle 1 is recognized by the driving mode signal, but this is only an example and the driving mode may be recognized by other methods. For example, in a case where the driving mode is set by a switch operation of a user, the driving mode may be determined by a signal generated by the switch operation. In another example, the drive recorder 2 may be provided with a driving mode setting switch so that the user can perform the switch operation according to the driving mode, and thus the driving mode may be determined based on switch states. In another example, it is considered that roads on which autonomous driving is allowed are limited. In this case, for example, it is considered that a configuration such that the drive recorder 2 determines whether or not it is a road on which autonomous driving is allowed based on map data and data of the location of the host vehicle is adopted. In such a configuration, the drive recorder 2 can determine the driving mode based on a determination result of whether or not it is a road on which autonomous driving is allowed. In this configuration, it is recommended that the drive recorder 2 determines, for example, operating conditions of the driver (a presence or an absence of the steering operation, an accelerator pedal operation, a brake pedal operation, etc.) by the image data or the like acquired from the camera that captures images within a vehicle cabin, and estimates the driving mode, also in consideration of the determination result.

Figure 3:
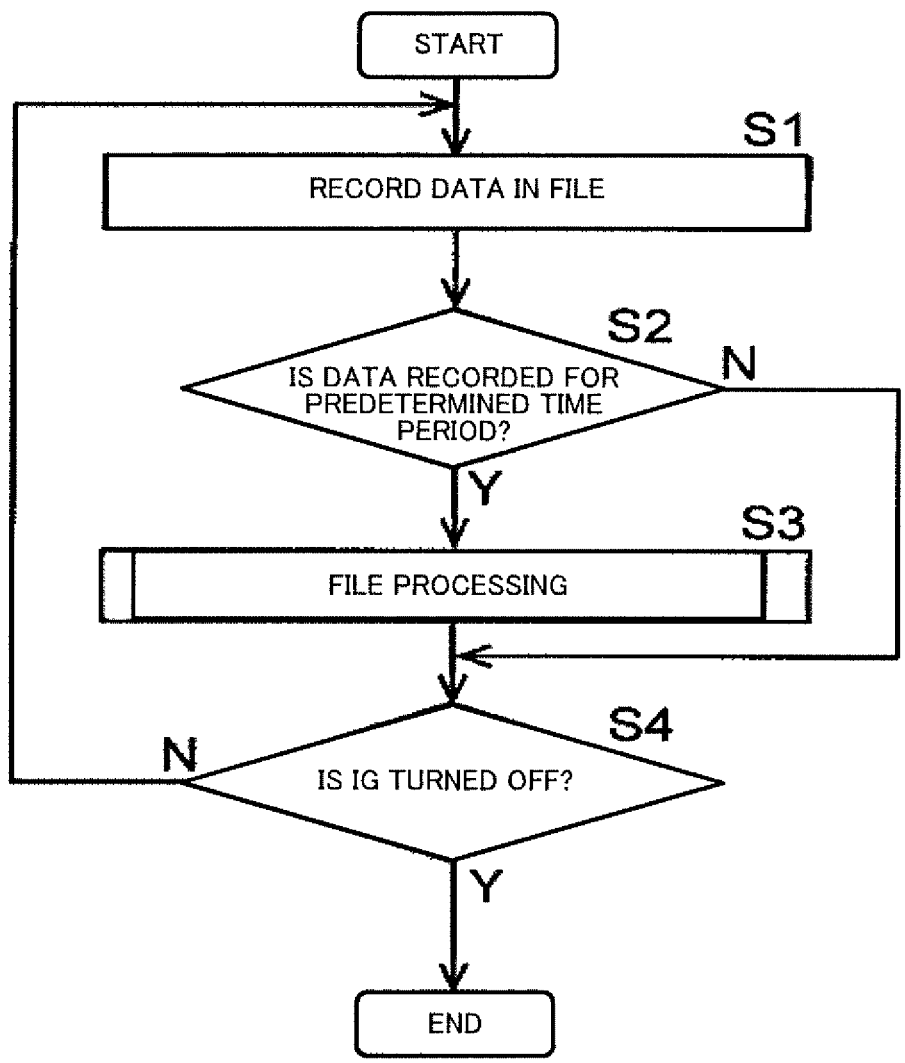
FIG. 3 illustrates a flowchart of a process of recording information in a memory card by a drive recorder according to a first embodiment.

Next, operations of the drive recorder 2 will be specifically described. FIG. 3 illustrates a flowchart of a process of recording information in the memory card 6 by the drive recorder 2 according to a first embodiment. The drive recorder 2 starts driving in response to a case in which the IG is turned on.

The CPU 20 records image information and audio information that is temporarily stored in the RAM 21 in one file formed in the memory card 6 (a step S1). Particularly, the CPU 20 adds additional information such as the vehicle information, the driving mode, a time and date or the like at a time at which the image is captured by the camera 3 to the image information temporarily stored in the RAM 21, and records the information in the file. In other words, the CPU 20 associates, as a data file, the information related to a driving condition of the vehicle 1 with the driving mode of the vehicle at a time at which the driving condition occurred, and records the data file in the memory card 6.

The information related to the driving condition includes, for example, a vehicle speed, the acceleration, the location or the like of the vehicle 1. In this embodiment, the information related to the driving condition of the vehicle 1 includes the image information captured by the camera 3 that is mounted on the vehicle 1. According to the configuration of this embodiment, the driving condition and the driving mode are temporally associated with each other and recorded in the recording medium. Therefore, it is possible to understand the driving mode at a moment at which an event, such as a traffic accident, occurred by analyzing information that is recorded in the recording medium and it is possible to accurately clarify causes of the traffic accident and the like.

After the CPU 20 has terminated recording the data in a file in the memory card 6, the CPU 20 determines whether or not the data is recorded in the file for a predetermined time period (a step S2). In this embodiment, a time period during which the data is recorded in one file is specified to be 5 minutes as one example. As described above, the time period to record the data in each file is set short so that driving information can be divided and stored in a large number of files. By dividing and recording the information in a large number of files, for example, even if the memory card 6 is damaged due to a traffic accident or the like, it is more possible to avoid a situation that all the data in the memory card 6 cannot be used.

In a case where the CPU 20 determines that the data of the predetermined time period is recorded in the file (Yes in the step S2), the CPU 20 executes a file processing (a step S3). The file processing is a process of performing a generation of a new file in which data should be recorded next, or a specification of a file in which data should be overwritten next. The file processing will be specifically described later.

In a case where the CPU 20 determines that the data of the predetermined time period is not recorded in the file (No in the step S2), or after the CPU 20 has executed the file processing in the step S3, the CPU 20 checks whether or not the IG is turned off (a step S4). In a case where the CPU 20 determines that the IG is not turned off (No in the step S4), the CPU 20 returns to the step S1, and records the next data in the file. That is, in the drive recorder 2, the information related to the driving condition of the vehicle 1 and the driving mode are temporally associated with each other and periodically recorded in the memory card 6. On the other hand, in a case where the CPU 20 determines that the IG is turned off (Yes in the step S4), the CPU 20 terminates a recording process of the driving information.

Figure 4:
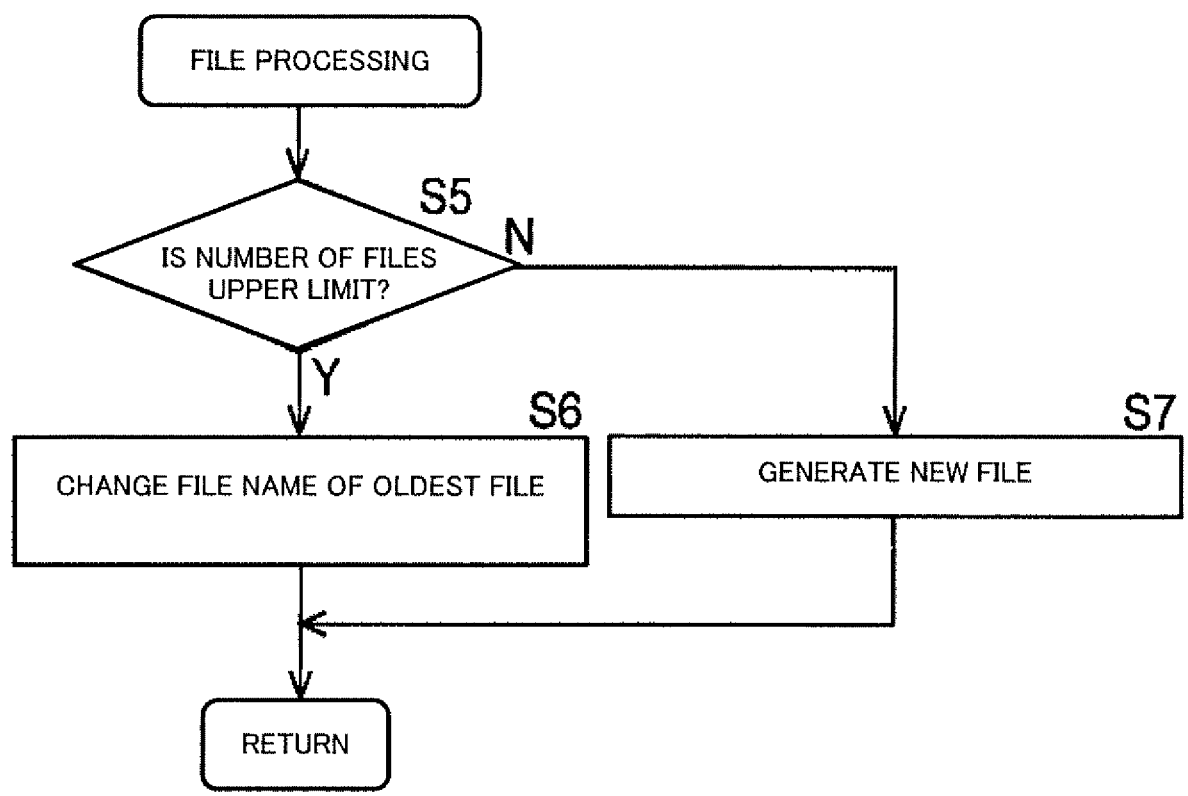
FIG. 4 illustrates a flowchart of a file processing in the drive recorder according to the first embodiment.

FIG. 4 illustrates a flowchart of the file processing in the drive recorder 2 according to the first embodiment. In a case where the CPU 20 executes the file processing, the CPU 20 determines whether or not a number of files is an upper limit (a step S5). In this embodiment, for example, a capacity of the memory card 6 is assumed to be 8 gigabytes. A capacity of each moving image file to store the image data and the audio data is assumed to be, for example, 50 megabytes. Therefore, the number of the files that can be generated in the memory card 6 is approximately 150. In a case where the number of the files generated in the memory card 6 exceeds 150, the CPU 20 determines that the number of the files is the upper limit.

In a case where the CPU 20 determines that the number of the files generated in the memory card 6 has reached the upper limit (Yes in the step S5), the CPU 20 selects the file in which the oldest record of data was made as the file to be overwritten with the next data, and changes a file name of the file (a step S6). Then, the data of the predetermined time period is recorded in this file. That is, a recorded file is overwritten with the new data. Since the file in which the oldest record of data was made is selected as the file to be overwritten, it is possible to store newer data.

In a case where the CPU 20 determines that the number of the files generated in the memory card 6 has not reached the upper limit (No in the step S5), the CPU 20 generates the new file to record the data (a step S7). The new file is given with a new file name. Then, the data of the predetermined time period is recorded in this new file. In a case where the CPU 20 has changed the file name in the step S6, or the CPU 20 has generated the new file in the step S7, the CPU 20 terminates the file processing. After terminating the file processing, the step S4 in FIG. 3 is executed.

It is recommended that the drive recorder 2 has functions to detect a sudden braking, an abrupt acceleration, or an occurrence of an event such as an impact, and the like. The CPU 20 detects the occurrence of the event based on the information that is acquired from, for example, the acceleration sensor 26, the vehicle speed sensor or the like. In such a configuration, in a case where the CPU 20 detects the occurrence of the event, for example, type information related to an event type, time information related to an occurrence time of the event, location information related to an occurrence location of the event, the driving mode when the event has occurred and the like are recorded in the memory card 6, together with the image information. It is recommended that a data overwriting process is prohibited for the file in which the information related to the event is included.

<1-2 Driving Information Display Processing System>

Figure 5:
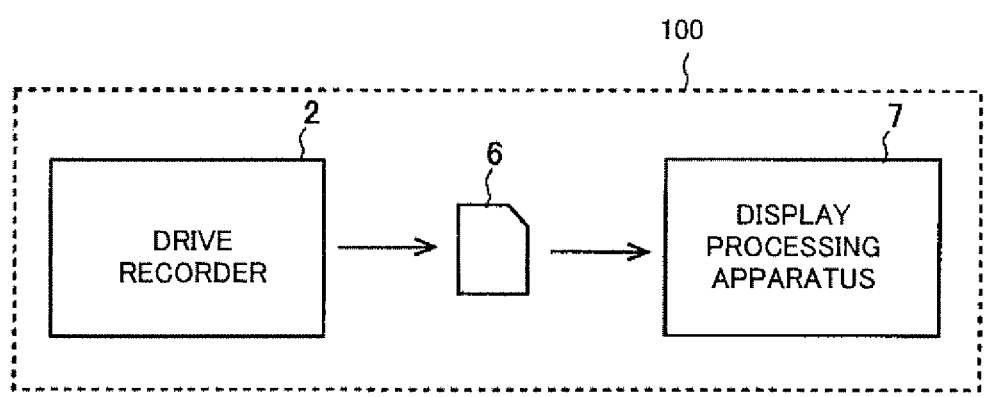
FIG. 5 is a diagram illustrating an outline of a display processing system.

FIG. 5 is a diagram illustrating an outline of a driving information display processing system 100 according to this embodiment. As illustrated in FIG. 5, the driving information display processing system 100 includes the drive recorder 2 and a display processing apparatus 7. The display processing apparatus 7 performs a process of displaying information that is recorded in the memory card 6 on a display apparatus (not illustrated in FIG. 5). In this embodiment, the display processing apparatus 7 performs a playback process of a moving image file that is recorded in the memory card 6. The driving information display processing system 100 according to this embodiment enables a driver itself and administrators of transportation companies to check the driving information recorded by the drive recorder 2 by using the display apparatus.

The display processing apparatus 7 may be, for example, a personal computer. In another embodiment, the display processing apparatus 7 may be an apparatus in a navigation system to be mounted on the vehicle 1. Furthermore, in another embodiment, the display processing apparatus 7 may be an apparatus to be incorporated in the drive recorder 2.

Figure 6:
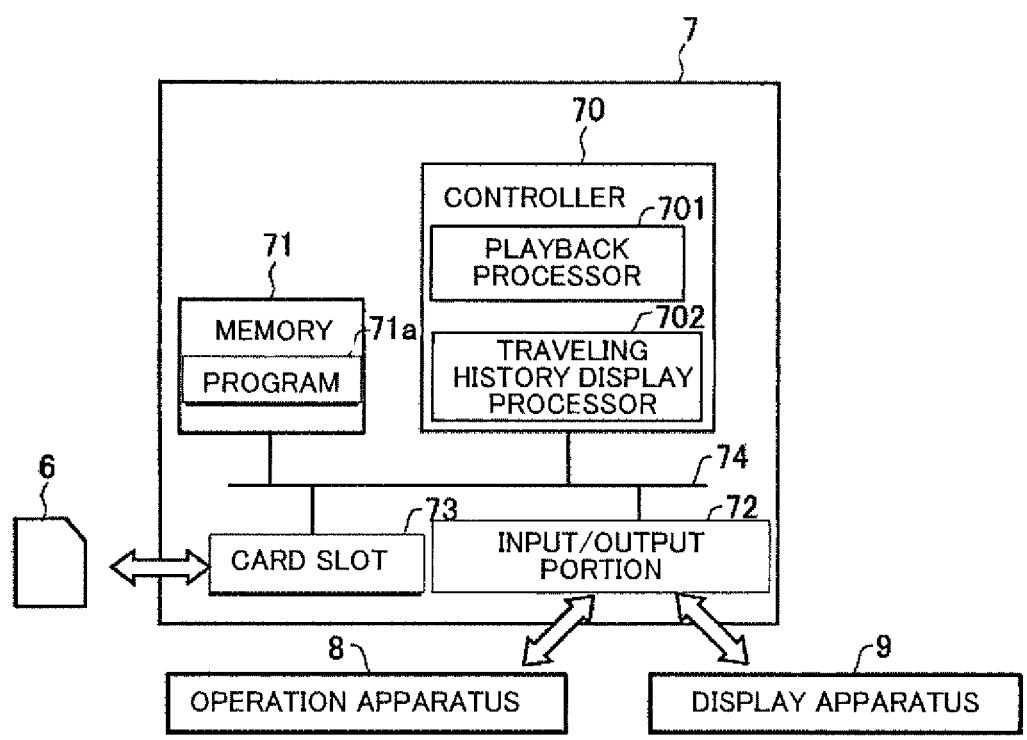
FIG. 6 is a block diagram illustrating a configuration of a display processing apparatus.

FIG. 6 is a block diagram illustrating a configuration of the display processing apparatus 7 according to this embodiment. The display processing apparatus 7 includes a controller 70, a memory 71, an input/output portion 72 and a card slot 73. The controller 70, the memory 71, the input/output portion 72 and the card slot 73 are interconnected with each other via a bus 74.

The controller 70 has a CPU and a peripheral circuit (ROM (read only memory), a RAM, an interface circuit, etc.) used for a process of the CPU. The controller 70 executes a calculation of various data and control of each part by executing a program 71a stored in the memory 71. Examples of the memory 71 include the hard disk drive, the flash memory and the like. The program 71a to be stored in the memory 71 is one example of the program according to the invention.

The input/output portion 72 is one or multiple interfaces to communicate various data with an apparatus that exists outside the display processing apparatus 7. The input/output portion 72 may be, for example, interfaces such as an interface for connecting a LAN (local area network) cable, an interface for connecting to a user interface, or a USB, etc.

Particularly, the input/output portion 72 is connected to an operation apparatus 8 and a display apparatus 9. The operation apparatus 8 may include, for example, any one of a touch panel, a key board, a mouse and a numeric keypad. The display apparatus 9 may be, for example, a liquid crystal display apparatus or the like. For example, in a case where the operation apparatus 8 is the touch panel, the operation apparatus 8 and the display apparatus 9 may be configured as one apparatus.

The card slot 73 is configured such that the memory card 6 is attachably and detachably mounted on the card slot 73. The memory card 6 is mounted on the card slot 73 so that it becomes possible to read the data from the memory card 6 and write the data into the memory card 6.

In this embodiment, the controller 70 includes a playback processor 701 and a traveling history display processor 702. Functions of the playback processor 701 and the traveling history display processor 702 included in the controller 70 can be realized by the CPU performing a calculation process according to the program 71a.

The playback processor 701 performs a playback process of moving image data recorded in the memory card 6 and a process of displaying the data on the display apparatus 9. The playback processor 701 displays, in a superimposed manner, driving information that is acquired from the memory card 6 on a display screen to play back the moving image data. The traveling history display processor 702 acquires a map from the map data of the memory 71 based on the location information of the vehicle 1 that is acquired from the memory card 6, and displays the map on the display screen of the display apparatus 9. The traveling history display processor 702, within a range of the map displayed on the display screen, displays in a superimposed manner a route history of the vehicle 1 that is acquired from the memory card 6 on the map.

Next, operations of the display processing apparatus 7 will be specifically described. The memory card 6 in which the driving information is recorded by the drive recorder 2 is inserted into the card slot 73 so that the display processing apparatus 7 can perform a process of displaying the driving information to be recorded in the memory card 6 on the display apparatus 9. For example, in a case where the display processing apparatus 7 is integrally provided in the drive recorder 2, or the like, it is not necessary to remove the memory card 6. The display processing apparatus 7 executes various processes by an instruction input from the operation apparatus 8.

The display processing apparatus 7 performs a process of displaying the driving mode that is temporally associated with the image information captured by the camera 3 and is recorded together with the image information. In this embodiment, the process is performed by the playback processor 701 according to a playback instruction from the operation apparatus 8. The playback processor 701 can read out the image information and the driving mode at a time at which the image information has been captured, from the memory card 6. The playback processor 701 displays, in a superimposed manner, the driving mode at a moment at which each image has been captured on the display screen to display the moving image captured by the camera 3.

Figure 7:
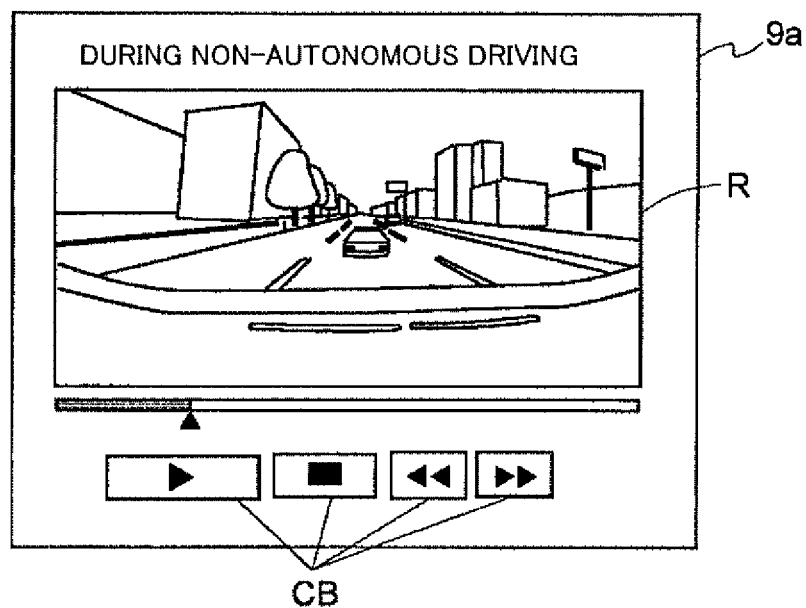
FIG. 7 is a diagram explaining a playback process performed by the display processing apparatus.

FIG. 7 is a diagram explaining the playback process performed by the display processing apparatus 7. Particularly, FIG. 7 is a diagram illustrating an image displayed on a display screen 9a of the display apparatus 9 by the process of the playback processor 701. As illustrated in FIG. 7, within the display screen 9a of the display apparatus 9, the driving mode is displayed on a playback area R on which the moving image acquired by the camera 3 capturing the images is played back. The driving mode to be displayed is determined by each image that constitutes the moving image, and in a case where the driving mode is changed, the display is switched. In this example, command buttons CB related to a playback operation are displayed under the playback area R. In this example, the driving mode is configured to be displayed together with the moving image, but the invention is not limited thereto. The driving mode may be configured to be displayed together with still images.

In an example illustrated in FIG. 7, as a word indicating the non-autonomous driving mode, an expression "During non-autonomous driving" is used. However, this is only an example, and other expressions may be used if it is possible to understand that the word indicates the driving mode. In this embodiment, as the word indicating the autonomous driving mode, the expression "During autonomous driving" is used. The position to display the driving mode is not limited to the position illustrated in this example, and the position to display the driving mode may be either side of the playback area R, under the playback area R, in some cases, the position to be overlapped with the playback area R.

As in this example, when the driving mode is configured to be displayed within the playback screen, a person who sees a recorded result of the driving information can understand the driving mode at each moment together with a playback image by playing back the image. Therefore, the person who sees the recorded result of the driving information can easily understand a relation between the driving condition and the driving mode.

The display processing apparatus 7 performs a process of associating the driving mode with the route history of the vehicle 1 and displaying the driving mode on the map that indicates the route history. The process is, in this embodiment, performed by the traveling history display processor 702 according to a display instruction of the route history by the operation apparatus 8. The traveling history display processor 702 can read out the location information of the vehicle 1 from the memory card 6 and the driving mode at a time at which the location information has been acquired. The traveling history display processor 702 can also read out the map data corresponding to the location information read out from the memory card 6, from the memory 71. The traveling history display processor 702 can display the map on which the route history and the driving mode are displayed in a superimposed manner on the display apparatus 9.

Figure 8:
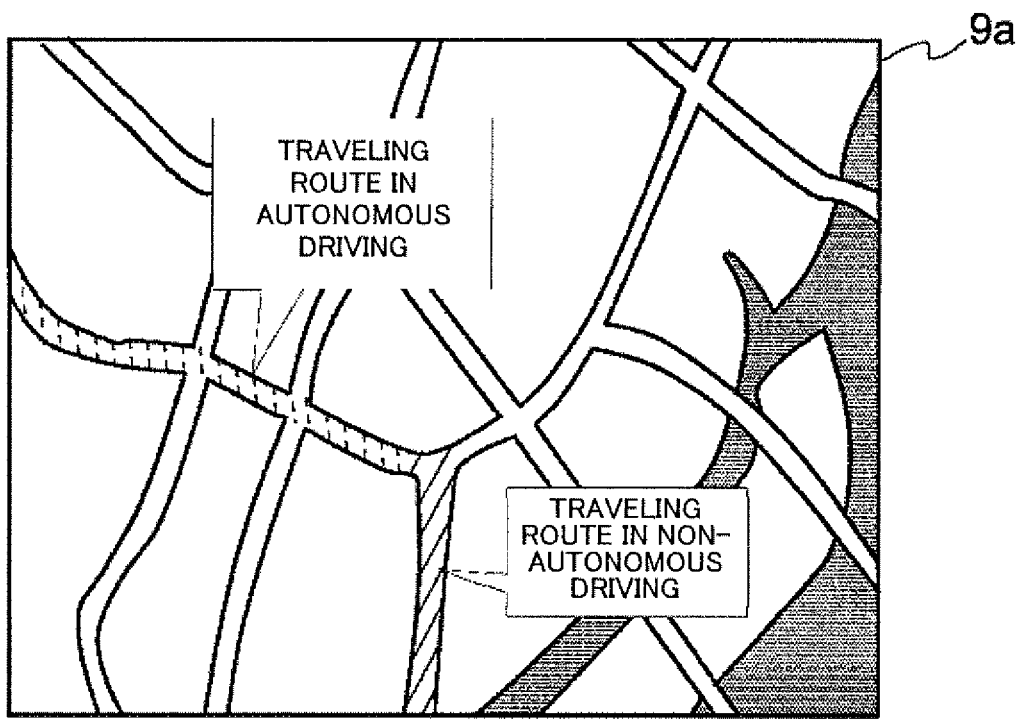
FIG. 8 is a diagram explaining a traveling history display process performed by the display processing apparatus.

FIG. 8 is a diagram explaining a traveling history display process performed by the display processing apparatus 7. Particularly, FIG. 8 is a diagram illustrating the image displayed on the display screen 9a of the display apparatus 9 by the process of the traveling history display processor 702. As illustrated in FIG. 8, the map that indicates the route history is displayed within the display screen 9a of the display apparatus 9. In this embodiment, the route history is indicated by painting out the road the vehicle 1 has passed, among the roads on the map.

In the route history, since a plurality of painting patterns are set for the road, it is possible to understand a change of the driving mode in the route history. Furthermore, in this embodiment, a "comment balloon" to indicate the driving mode is provided depending on each painting pattern so that it is possible to easily understand the driving mode at each location. The indication of the driving mode is not limited to this example, and may be changed as appropriate. The indication of the driving mode may be the indication with which the person who sees the display screen 9a can easily check the driving mode on the route history. For example, the "comment balloon" indication may be deleted. The word indicating the driving mode may be expressed differently. In this embodiment, in the route history, a route traveled in the autonomous driving mode is expressed as an autonomous driving route and a route traveled in the non-autonomous driving mode is expressed as a non-autonomous driving route.

As in this example, when the driving mode is configured to be displayed on the map indicating the route history, the person who sees the recorded result of the driving information can immediately recognize which location the vehicle 1 was and which driving mode the vehicle 1 was in.

In a case where a location specification is performed on the display screen 9a that displays the map on which the driving mode associated with the route history of the vehicle 1 is displayed, the display processing apparatus 7 performs a process of displaying the image information corresponding to the specified location. In this embodiment, the location specification is performed by using the operation apparatus 8. For example, in a case where the operation apparatus 8 is the touch panel, the location specification is performed by touching the display screen. For example, in a case where the operation apparatus 8 is the mouse, the location specification is performed by moving a cursor.

In this embodiment, the playback processor 701 reads out the moving image data including the image information of the specified location from the file to be formed in the memory card 6, based on coordinate information to be output from the operation apparatus 8. The playback processor 701 performs the playback process of the read-out moving image data and displays the data on the display apparatus 9. The playback processor 701 displays, in a superimposed manner, the driving mode that is temporally associated with each image on the display screen to play back the moving image data. That is, in this embodiment, the moving image in a vicinity of the specified location is displayed by the display apparatus 9, together with the driving mode. This is only an example, and for example, still images of the specified location may be configured to be displayed on the display apparatus 9, together with the driving mode. For example, only the moving images in the specified location and the following route history may be configured to be displayed by the display apparatus 9, together with the driving mode.

Figure 9:
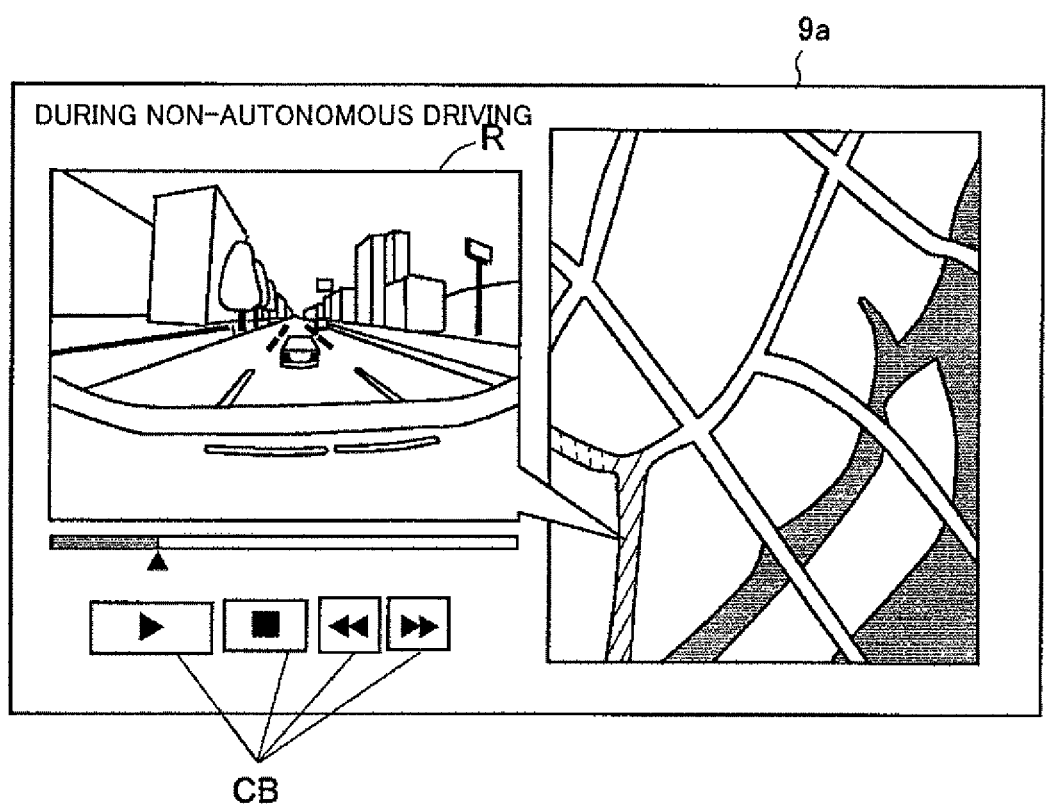
FIG. 9 illustrates a situation in which a moving image is displayed on a display screen by a location specification on a map screen.

FIG. 9 illustrates a situation in which the moving image is displayed on the display screen 9a by the location specification on a map screen. As illustrated in FIG. 9, in a case where the moving image is played back by the location specification from the map screen, the display screen 9a is mainly divided into two areas. In a right area, the map including the specified location is displayed. In a left area, the playback area R on which the moving image data is played back is included. The playback area R is represented as the "comment balloon" from the specified location. In the left area, the driving mode that is temporally associated with the image is displayed above the playback area R. In the left area, the command buttons CB related to the playback operation are displayed under the playback area R.

In this example, the location on the map that indicates the route history and the driving mode is specified so that the image information of the location can be easily seen. In this example, the person who sees the recorded result of the driving information can easily select and see the image information of the specified driving mode. Therefore, it is possible to improve usability of the driving information recorded by the drive recorder 2.

2. Second Embodiment

Next, a second embodiment will be described. Configurations of a drive recorder and a driving information display processing system of the second embodiment are the same as those of the first embodiment. Therefore, the same components will be denoted by the same symbols, and overlapped description thereof will be omitted.

In the second embodiment, a file processing that is executed by a CPU 20 of a drive recorder 2 is different from the file processing of the first embodiment. In the first embodiment, as illustrated in FIG. 4, in a case where the CPU 20 determines that a number of files generated in a memory card 6 has reached an upper limit, the CPU 20 is configured to overwrite a file in which the oldest record of data was made. On this point, the second embodiment is different from the first embodiment. Only this different part will be described below.

In the second embodiment, in a case where a capacity of the memory card 6 has become full, the CPU 20 selects a previously-recorded data file recorded in a recording area to be overwritten by a newly-created data file based on a driving mode of the previously-recorded data file. Particularly, the CPU 20 does not overwrite a file in which a priority storage mode is recorded, and overwrites a file in which the priority storage mode is not recorded. The priority storage mode means the driving mode in which priority storage of recorded data is performed. In this embodiment, the driving mode is either an autonomous driving mode or a non-autonomous driving mode. The priority storage mode may be a fixed storage mode that is unswitchable, but a switchable storage mode is recommended. The priority storage mode, for example, may be configured to be switchable only in a factory, or may be configured to be switchable by a person who uses the drive recorder 2 shipped from the factory.

Figure 10:
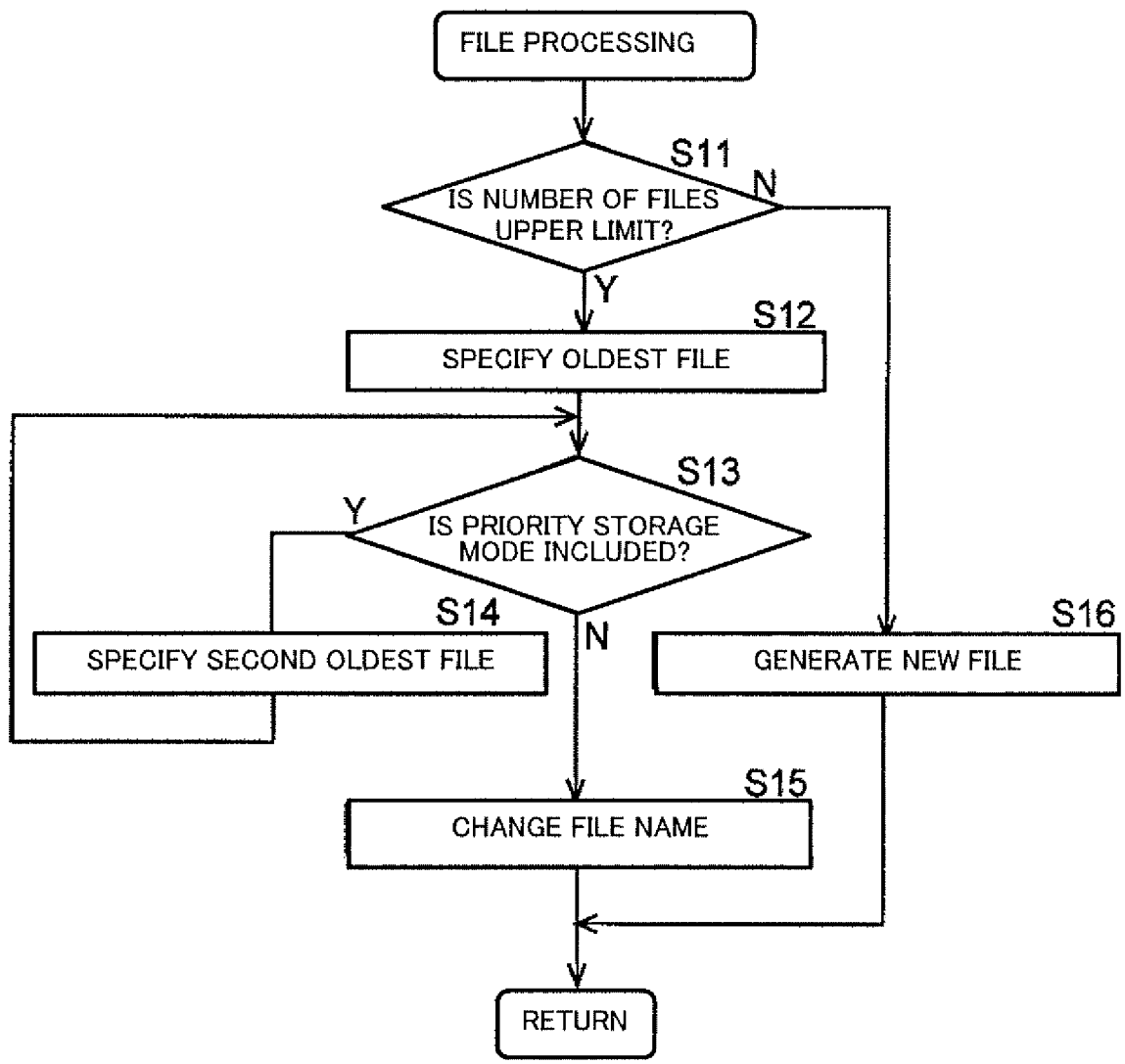
FIG. 10 illustrates a flowchart of a file processing in a drive recorder according to a second embodiment.

FIG. 10 illustrates a flowchart of the file processing in the drive recorder 2 according to the second embodiment. In a case where the CPU 20 executes the file processing, the CPU 20 determines whether or not the number of the files is the upper limit (a step S11). Details of the determination are the same as those of the first embodiment, and thus description thereof will be omitted.

In a case where the CPU 20 determines that the number of the files generated in the memory card 6 has reached the upper limit (Yes in the step S11), the CPU 20 specifies the file in which the oldest record of data was made as the file to be overwritten with next data (a step S12). After the CPU 20 has specified the file, the CPU 20 determines whether or not the data related to the priority storage mode is included in the data of the specified file (a step S 13). The CPU 20 temporally associates the driving mode with image information captured by a camera 3, and records the driving mode when recording data in a file. Therefore, the CPU 20 can determine whether or not the data related to the priority storage mode is included in the data of the specified file.

In a case where the CPU 20 determines that the data related to the priority storage mode is included in the data of the specified file (Yes in the step S13), the CPU 20 specifies the file in which the second oldest record of data after the specified file in the step S12 was made (a step S14). Then, the CPU 20 returns to the step S13 and re-determines whether or not the data related to the priority storage mode is included in the specified file. This determination is repeated until the file in which the data related to the priority storage mode is not included is specified.

In some cases, a situation that the data related to the priority storage mode is included in all files may occur. In this case, the file in which the oldest record of data was made may be overwritten.

In a case where the CPU 20 determines that the data related to the priority storage mode is not included in the specified file (No in the step S13), the CPU 20 changes a file name of the specified file (a step S15). Then, the data of a predetermined time period is recorded in this file. That is, the recorded file is overwritten with the new data.

On the other hand, in a case where the CPU 20 determines that the number of the files generated in the memory card 6 has not reached the upper limit (No in the step S11), the CPU 20 generates a new file to record data (a step S16). The new file is given with a new file name. Then, the data is recorded in this new file. In a case where the CPU 20 has changed the file name in the step S15, or the CPU 20 has generated the new file in the step S16, the CPU 20 terminates the file processing.

According to this embodiment, driving information of the driving mode the person wants to keep can be preferentially kept in the memory card 6. Therefore, it is possible to effectively store the driving information in the memory card 6. For example, in this embodiment, it is possible to preferentially store the driving information during non-autonomous driving in which a driver becomes liable.

3. Third Embodiment

Next, a third embodiment will be described. Configurations of a drive recorder and a driving information display processing system of the third embodiment are the same as those of the first embodiment. Therefore, the same components will be denoted by the same symbols, and overlapped description thereof will be omitted. In the third embodiment, a recording process of the driving information and a file processing method that are executed by a CPU 20 of a drive recorder 2 are different from those of the first embodiment. Only this different part will be described below.

In the third embodiment, in a case where a capacity of a memory card 6 has become full, the CPU 20 excludes a recording area including information recorded before and after switching between driving modes from the recording areas to be overwritten, and performs an overwriting process. Particularly, the CPU 20 excludes a file in which the driving information recorded before and after switching between the driving modes is recorded from files to be overwritten. That is, the CPU 20 excludes a previously-recorded data file recorded in the recording area from being overwritten by a newly-created data file when the previously-recorded data file was recorded immediately before or immediately after switching occurred between driving modes. Even if the capacity of the memory card 6 has become full, the CPU 20 does not overwrite the file that is excluded from the files to be overwritten.

Figure 11:
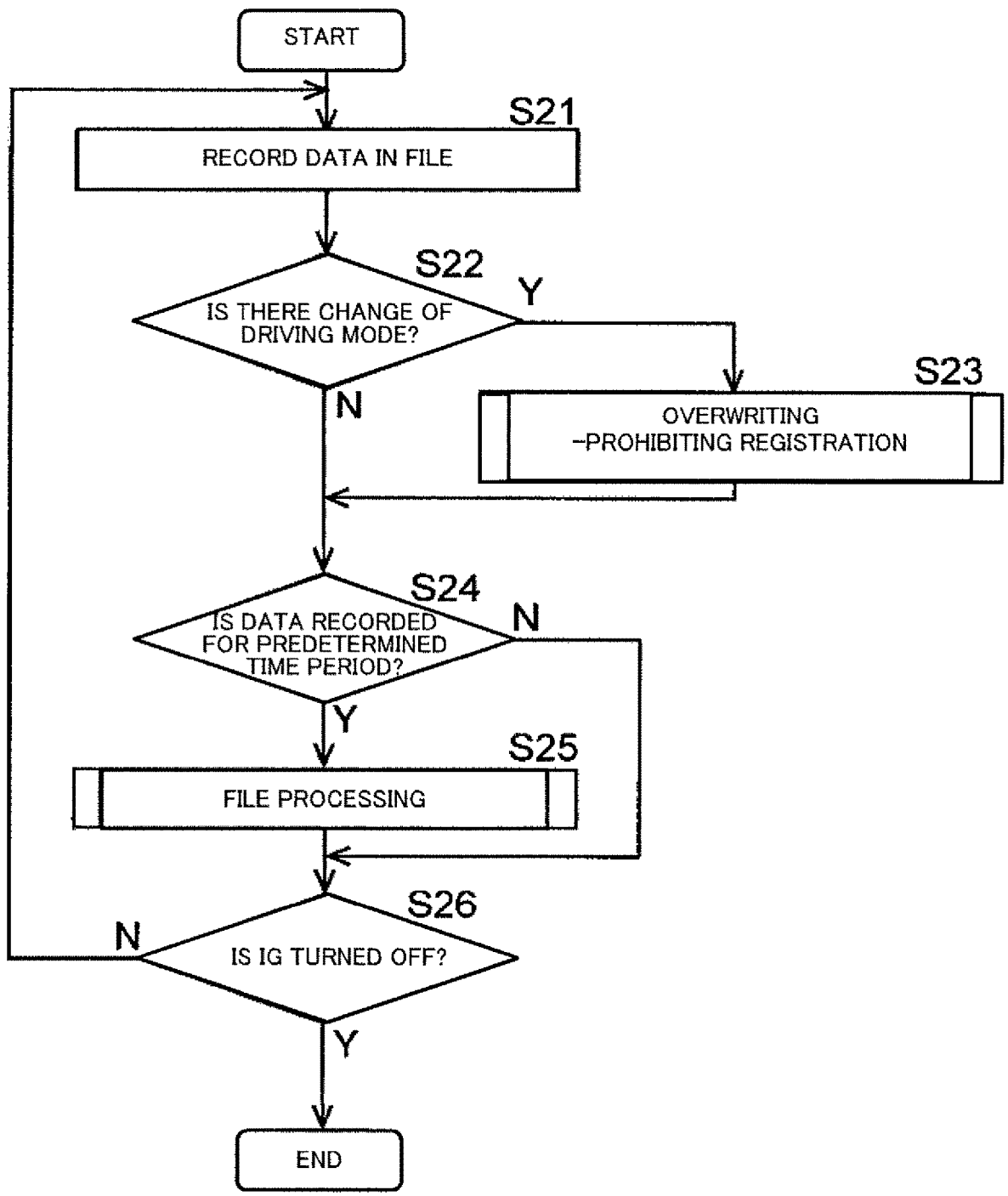
FIG. 11 illustrates a flowchart of a process of recording information in a memory card by a drive recorder according to a third embodiment.

FIG. 11 illustrates a flowchart of a process of recording information in the memory card 6 by the drive recorder 2 according to the third embodiment. The drive recorder 2 starts driving in response to a case in which an IG is turned on.

The CPU 20 records image information and audio information that are temporarily stored in a RAM 21 in one file formed in the memory card 6 (a step S21). Since the configuration of the process is the same as that of the first embodiment (refer to the description of the step S1 in FIG. 3), a detailed description thereof will be omitted.

After the CPU 20 has terminated recording data in the file in the memory card 6, the CPU 20 compares a driving mode recorded this time to the driving mode recorded previous time and determines whether or not there is a change of the driving mode (a step S22). In a case where the CPU 20 determines that there is a change of the driving mode (Yes in the step S22), the CPU 20 performs an overwriting-prohibiting registration (a step S23). The overwriting-prohibiting registration is a process of registering a file that is excluded from the files to be overwritten. The overwriting-prohibiting registration will be described later in detail.

In a case where the CPU 20 determines that there is no change of the driving mode (No in the step S22), or after the CPU 20 has executed the overwriting-prohibiting process in the step S23, the CPU 20 determines whether or not the data is recorded in the file for a predetermined time period (a step S24). Since the configuration of the process is the same as that of the first embodiment (refer to the description of the step S2 in FIG. 3), a detailed description thereof will be omitted.

In a case where the CPU 20 determines that the data of the predetermined time period is recorded in the file (Yes in the step S24), the CPU 20 executes the file processing (a step S25). This file processing is different from the file processing of the first embodiment. Details of the file processing will be described later.

In a case where the CPU 20 determines that the data of the predetermined time period is not recorded in the file (No in the step S24), or after the CPU 20 has executed the file processing in the step S25, the CPU 20 checks whether or not the IG is turned off (a step S26). In a case where the CPU 20 determines that the IG is not turned off (No in the step S26), the CPU 20 returns to the step S21, and records next data in the file. On the other hand, in a case where the CPU 20 determines that the IG is turned off (Yes in the step S26), the CPU 20 terminates a recording process of the driving information.

Figure 12:
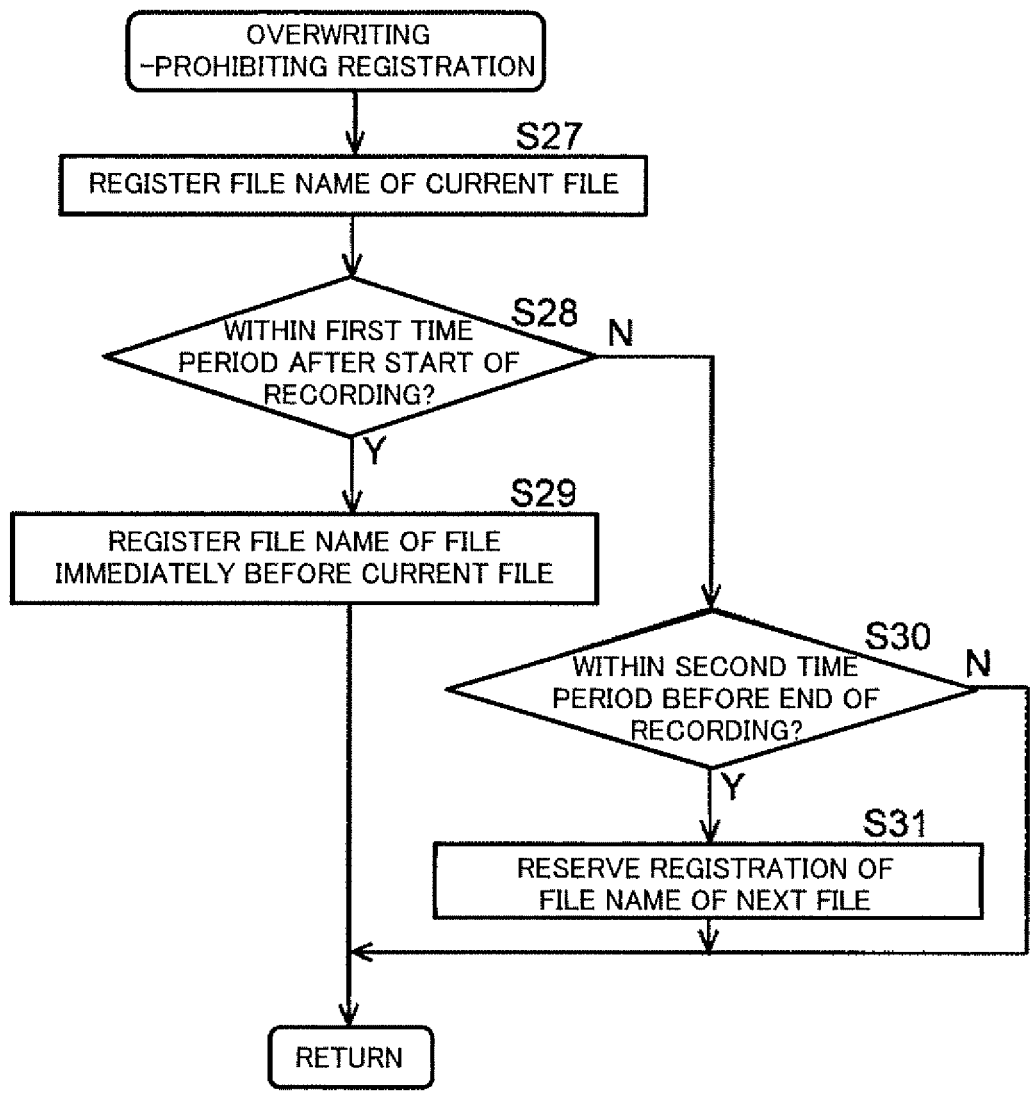
FIG. 12 illustrates a flowchart of a process of an overwriting-prohibiting registration in the drive recorder according to the third embodiment.

FIG. 12 illustrates a flowchart of a process of the overwriting-prohibiting registration in the drive recorder 2 according to the third embodiment. The overwriting-prohibiting registration is executed in a case where the CPU 20 compares the driving mode recorded this time to the driving mode recorded previous time, and determines that there is a change of the driving mode. The CPU 20 registers a file name of the file (current file) of the driving mode recorded this time on an overwriting-prohibiting list (a step S27). In this embodiment, the overwriting-prohibiting list is a table-type list including a plurality of records and information to be recorded in the memory card 6. The file name of the file prohibited from being overwritten by the CPU 20 is registered on a record.

In a case where the CPU 20 registers the file name of the current file on the overwriting-prohibiting list, the CPU 20 determines whether or not this time record of the driving mode or the like is executed within a first time period after a start of recording in the current file (a step S28). The first time period is, for example, about several minutes to several tens of minutes. In a case where the CPU 20 determines that this time record is executed within the first time period after the start of recording in the current file (Yes in the step S28), the CPU 20 registers the file name of the file in which the data is recorded immediately before the current file on the overwriting-prohibiting list (a step S29).

On the other hand, in a case where the CPU 20 determines that this time record is not executed within the first time period after the start of recording in the current file (No in the step S28), the CPU 20 determines whether or not this time record is executed within a second time period before an end of recording in the current file (a step S30). The first time period and the second time period may be the same or different. The second time period is also, for example, about several minutes to several tens of minutes.

In a case where the CPU 20 determines that this time record is executed within the second time period before the end of recording in the current file (Yes in the step S30), the CPU 20 makes a reservation to register the file name of the file in which data is recorded next to the current file on the overwriting-prohibiting list (a step S31). The reason for reserving the registration is that the file name of the file to be recorded next has not been decided at this time.

In a case where the CPU 20 registers the file name of the file immediately before the current file in the step S29, in a case where the CPU 20 determines that this time record is not executed within the second time period before the end of recording in the current file in the step S30 (No in the step S30), or in a case where the CPU 20 makes a reservation to register the file name of the next file, the CPU 20 terminates the process of the overwriting-prohibiting registration. After terminating the process of the overwriting-prohibiting registration, the step S24 in FIG. 11 is executed.

Figure 13:
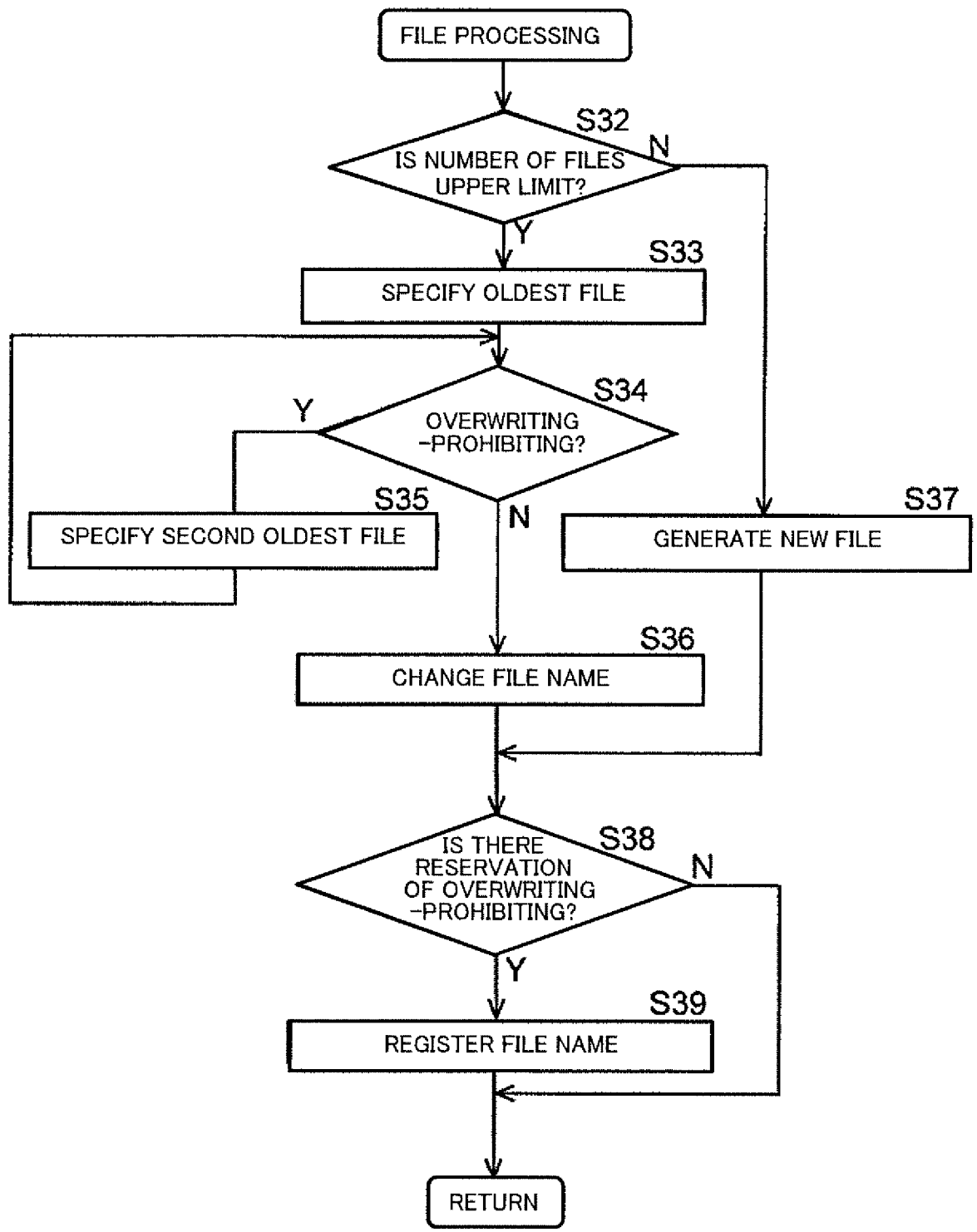
FIG. 13 illustrates a flowchart of a file processing in the drive recorder according to the third embodiment.

FIG. 13 illustrates a flowchart of the file processing in the drive recorder 2 according to the third embodiment. In a case where the CPU 20 executes the file processing, the CPU 20 determines whether or not a number of files is an upper limit (a step S32). Details of the determination are the same as those of the first embodiment, and thus description thereof will be omitted.

In a case where the CPU 20 determines that the number of the files generated in the memory card 6 has reached the upper limit (Yes in the step S32), the CPU 20 specifies the file in which the oldest record of data was made as the file to be overwritten with the next data (a step S33). After the CPU 20 has specified the file, the CPU 20 determines whether or not the specified file is registered on the overwriting-prohibiting list with reference to the overwriting-prohibiting list (a step S34).

In a case where the CPU 20 determines that the specified file is registered on the overwriting-prohibiting list (Yes in the step S34), the CPU 20 specifies the file in which the second oldest record of data after the specified file in the step S33 was made (a step S35). Then, the CPU 20 returns to the step S34 and re-determines whether or not the specified file is registered on the overwriting-prohibiting list. This determination is repeated until the file that is not registered on the overwriting-prohibiting list is specified.

In a case where the CPU 20 determines that the specified file is not registered on the overwriting-prohibiting list (No in the step S34), the CPU 20 changes the file name of the specified file (a step S36). Then, the data of the predetermined time period is recorded in this file. That is, the recorded file is overwritten with the new data.

On the other hand, in a case where the CPU 20 determines that the number of the files generated in the memory card 6 has not reached the upper limit (No in the step S32), the CPU 20 generates a new file to record data (a step S37). The new file is given with a new file name. Then, the data is recorded in this new file.

In a case where the CPU 20 changes the file name in the step S36, or in a case where the CPU 20 gives the new file name to the new file in the step 37, the CPU 20 determines whether or not there is a reservation of the overwriting-prohibiting registration (a step S 38). The reservation of the overwriting-prohibiting registration is caused by the process of the overwriting-prohibiting registration described above. In a case where the CPU 20 determines that there is a reservation of the registration (Yes in the step S38), the CPU 20 registers the file name changed in the step S36, or the file name newly given in the step S37 on the overwriting-prohibiting list (a step S39).

In a case where the CPU 20 performs the registration on the overwriting-prohibiting list in the step S39, or determines that there is no reservation of the registration (No in the step S38), the CPU 20 terminates the file processing. After terminating the file processing, the step S26 in FIG. 11 is executed.

Before and after switching between driving modes, it is expected that there is a high possibility that an event such as a traffic accident occurs. In this embodiment, the driving information recorded before and after switching between driving modes is stored without being overwritten. Therefore, it is possible to effectively store the data to investigate causes of traffic accidents, monitor driver's driving conditions by transportation companies, or the like.

4. Notes

In the meantime, the various technical features disclosed in the present specification are able to be modified in various ways without departing from the spirit of the technical creation besides the above embodiments. The embodiments and the modifications disclosed in the present specification may be conducted in combination to the extent possible.

For example, in the embodiments described above, the drive recorder 2 is configured to record the image information captured by the camera 3 in the memory card 6 in both cases of the autonomous driving mode and the non-autonomous driving mode. However, this is only an example. For example, a CPU of a drive recorder may be configured to record the image information captured by the camera 3 in the memory card 6 only in a case where the driving mode is a specific driving mode. In such a configuration, since the image information is recorded only in the driving mode in which the image information is particularly required, it is possible to downsize a capacity of a recording medium. For the specific driving mode, for example, either the autonomous driving mode or the non-autonomous driving mode can be exemplified. The specific driving mode may be switchably provided.

In the third embodiment described above, in a case where the capacity of the memory card 6 has become full, the CPU 20 is configured to exclude the recording area including information recorded before and after switching between driving modes from the recording areas to be overwritten, and performs the overwriting process. However, this is only an example, and a different recording area from the recording area that is excluded from the recording areas to be overwritten by the CPU 20 may be included in the recording area to be excluded. The driving mode can be configured to automatically switch when the vehicle 1 enters a place in which the autonomous driving is allowed or not allowed. In such a configuration, in a case where the capacity of the memory card 6 has become full, it is recommended that the CPU 20 excludes the recording area including information recorded before and after the vehicle 1 has entered a place in which the driving mode should be switched from the recording areas to be overwritten, and performs the overwriting process. That is, it is recommended that the CPU 20 excludes a previously-recorded data file recorded in the recording area from being overwritten by a newly-created data file when the previously-recorded data file was recorded immediately before or immediately after the vehicle 1 entered the place in which the driving mode should be switched. Particularly, the CPU 20 identifies the data recorded before and after the vehicle 1 has entered the place in which the driving mode should be switched by location information of the vehicle 1 included in the information related to a driving condition of the vehicle 1. The CPU 20 excludes a file in which the driving information recorded before and after the vehicle has entered the place in which the driving mode should be switched is recorded from files to be overwritten. Even if the capacity of the memory card 6 has become full, the CPU 20 does not overwrite the file that is excluded from the files to be overwritten. With such a configuration, it is possible to surely store the driving information in a place in which there is a high possibility that an event such as a traffic accident occurs.

In the above, a case in which the invention is applied to a drive recorder has been described, but this is only an example. The invention may be applied to a driving information recording apparatus, other than drive recorders, such as an event recorder in which the image information is not recorded. However, it is recommended that the information related to the driving condition of the vehicle, as in the embodiments described above, includes the image information captured by the camera that is mounted on the vehicle. Therefore, it is possible to more specifically understand the driving condition of the vehicle 1 and accurately investigate causes of traffic accidents and the like.

In the embodiments described above, it has been described that various functions are realized by software by the CPU performing a calculation process according to the program, but at least some of the functions may be realized by an electrical hardware circuit. Conversely, at least some of the functions to be realized by a hardware circuit may be realized by software.

While the invention has been shown and described in detail, the foregoing description is in all aspects illustrative and not restrictive. It is therefore understood that numerous other modifications and variations can be devised without departing from the scope of the invention.

What is claimed is:

1. A driving information recording apparatus that records driving information of a vehicle, the apparatus comprising:
   a memory having a plurality of recording areas that form a capacity of the memory; and
   a processor operatively coupled to the memory, the processor being programmed to:
   associate information related to a driving condition of the vehicle together with a driving mode of the vehicle at a time at which the driving condition occurred, the driving mode including an autonomous driving mode and a non-autonomous driving mode,
   generate a first data file that includes the associated information,
   record the first data file in the memory, and
   in a case where the storage capacity of the memory has become full, preferentially select a first recording area storing a second data file associated with the autonomous driving mode to be overwritten with the first data file rather than a second recording area storing a third data file associated with the non-autonomous driving mode.

2. The driving information recording apparatus according to claim 1, wherein the information related to the driving condition of the vehicle includes image information captured by a camera that is mounted on the vehicle.

3. The driving information recording apparatus according to claim 2, wherein
the processor records the data file in the memory only in a case where the driving mode of the data file is a specific driving mode.

4. The driving information recording apparatus according to claim 1, wherein
the processor selects a previously-recorded data file recorded in the recording area to be overwritten by a newly-created data file based on the driving mode of the previously-recorded data file in a case where the capacity of the memory has become full.

5. The driving information recording apparatus according to claim 1, wherein
in a case where the capacity of the memory has become full, the processor excludes a previously-recorded data file recorded in the recording area from being overwritten by a newly-created data file when the previously-recorded data file was recorded immediately before or immediately after switching occurred between the driving modes.

6. The driving information recording apparatus according to claim 1, wherein
the information related to the driving condition of the vehicle includes location information of the vehicle, and
in a case where the capacity of the memory has become full, the processor excludes a previously-recorded data file recorded in the recording area from being overwritten by a newly-created data file when the previously-recorded data file was recorded immediately before or immediately after the vehicle entered a place in which the driving mode should be switched.

7. The driving information recording apparatus according to claim 1, wherein
the autonomous driving mode is a mode in which at least any one of a driving operation, a braking operation and a steering operation of the vehicle is automatically performed, regardless of an operation by a driver.

8. A display system that displays driving information, the display system comprising:
a memory having a plurality of recording areas that form a capacity of the memory; and
a driving information recording apparatus that records driving information of a vehicle, the driving information recording apparatus having a processor operatively coupled to the memory, the processor being programmed to:
associate information related to a driving condition of the vehicle together with a driving mode of the vehicle at a time at which the driving condition occurred, the driving mode including an autonomous driving mode and a non-autonomous driving mode,
generate a first data file that includes the associated information,
record the first data file in the memory, and
in a case where the storage capacity of the memory has become full, preferentially select a first recording area storing a second data file associated with the autonomous driving mode to be overwritten with the first data file rather than a second recording area storing a third data file associated with the non-autonomous driving mode; and
a display processing apparatus that displays the information and the driving mode recorded in the memory on a display apparatus.

9. The display system according to claim 8, wherein
the information related to the driving condition of the vehicle includes image information captured by a camera that is mounted on the vehicle, and
the display processing apparatus displays the driving mode and the image information that is temporally associated with the image information.

10. The display system according to claim 9, wherein
in a case where a location specification of a specified location is performed on a display screen that displays a map on which the driving mode associated with a route history of the vehicle is displayed, the display processing apparatus displays the image information corresponding to the specified location.

11. The display system according to claim 9, wherein
the processor records the data file in the memory, only in a case where the driving mode of the data file is a specific driving mode.

12. The display system according to claim 8, wherein
the display processing apparatus associates the driving mode with a route history of the vehicle and displays the driving mode on a map that indicates the route history.

13. A method of recording driving information of a vehicle into a memory having a plurality of recording areas that form a capacity of the memory, the method comprising:
acquiring information related to a driving condition of the vehicle;
associating the information related to the driving condition of the vehicle together with a driving mode at a time at which the driving condition occurred, the driving mode including an autonomous driving mode and a non-autonomous driving mode;
generating a first data file that includes the associated information;
recording the first data file in the memory; and
in a case where the storage capacity of the memory has become full, preferentially selecting a first recording area storing a second data file associated with the autonomous driving mode to be overwritten with the first data file rather than a second recording area storing a third data file associated with the non-autonomous driving mode.

14. The recording method according to claim 13, wherein
the information related to the driving condition includes image information captured by a camera that is mounted on the vehicle.

15. The recording method according to claim 14, further comprising:
recording the first data file in the memory only when the driving mode associated with the first data file corresponds to a specific driving mode.

16. The recording method according to claim 13, further comprising:
selecting a previously-recorded data file recorded in the recording area to be overwritten by a newly-created data file based on the driving mode of the previously-recorded data file when the capacity of the memory has become full.

17. The recording method according to claim 13, further comprising:
excluding a previously-recorded data file in the recording area from being overwritten by a newly-created data file when the previously-recorded data file was recorded immediately before or immediately after switching occurred between the driving modes when the capacity of the memory has become full.

18. The recording method according to claim 13, wherein the information related to the driving condition of the vehicle includes location information of the vehicle, and in a case where the capacity of the memory has become full, a previously-recorded data file in the recording area is excluded from being overwritten by a newly-created data file when the previously-recorded data file was recorded immediately before or immediately after the vehicle entered a place in which the driving mode should be switched.

* * * * *